(12) United States Patent
Bentrim et al.

(10) Patent No.: US 9,086,086 B2
(45) Date of Patent: Jul. 21, 2015

(54) QUICK ACTING PANEL FASTENER

(75) Inventors: Brian Bentrim, Furlong, PA (US);
Michael Maloney, Doylestown, PA (US)

(73) Assignee: PEM Management, Inc., Wilmington, DE (US)

( * ) Notice: Subject to any disclaimer, the term of this patent is extended or adjusted under 35 U.S.C. 154(b) by 321 days.

(21) Appl. No.: 12/842,214

(22) Filed: Jul. 23, 2010

(65) Prior Publication Data
US 2011/0020092 A1  Jan. 27, 2011

Related U.S. Application Data

(60) Provisional application No. 61/228,314, filed on Jul. 24, 2009.

(51) Int. Cl.
*F16B 21/02* (2006.01)
*F16B 21/20* (2006.01)

(52) U.S. Cl.
CPC .............. *F16B 21/02* (2013.01); *F16B 21/20* (2013.01)

(58) Field of Classification Search
CPC .......... F16B 21/00; F16B 21/02; F16B 21/06; F16B 21/065; F16B 21/07; F16B 21/076; F16B 21/08
USPC ........... 24/293, 295, 289–292, 294, 297, 458, 24/607, 614, 662, 664, 666, 683; 411/15, 411/44–48, 349, 352–353, 356–358, 411/520–524, 508, 913, 970, 360, 509, 510, 411/552, 563; 52/584.1, 582.1, 796.1, 703, 52/718.06; 403/179, 350, 373, 374.1, 403/374.2, 408.1, 409.1
See application file for complete search history.

(56) References Cited

U.S. PATENT DOCUMENTS

| 220,702 | A | * | 10/1879 | Oddie | 492/14 |
| 2,208,779 | A | | 7/1940 | Tinnerman | |
| 2,244,975 | A | * | 6/1941 | Tinnerman | 411/352 |
| 2,369,962 | A | * | 2/1945 | Gisondi | 411/523 |
| 2,589,028 | A | * | 3/1952 | Poupitch | 411/352 |
| 2,853,114 | A | * | 9/1958 | Barry | 411/352 |

(Continued)

FOREIGN PATENT DOCUMENTS

EP  2 175 146 A2 * 4/2010
WO  WO 2008/128560 A1 * 10/2008

(Continued)

*Primary Examiner* — Gay Ann Spahn
(74) *Attorney, Agent, or Firm* — Ryder, Lu, Mazzeo & Konieczny, LLC; Joseph M. Konieczny, Sr.; Gregory J. Gore

(57) ABSTRACT

A panel fastener is comprised of two separately formed interacting parts: a panel retainer and an actuator pin. The retainer is fashioned from sheet metal using progressive stamping technology. The retainer and pin work together to create a fastener for securing two panels together that can semi-permanently snap into the first panel and then be clamped onto and then selectively removed from the second panel. Attachment to the second panel is obtained by expanding and later released by contracting the legs of the retainer by rotating a cammed expander pin between self-locking positions. A head of the expander pin can be configured for hand actuation, tool-only actuation, or both. The retainer is fashioned from sheet metal using progressive stamping technology.

13 Claims, 4 Drawing Sheets

(56) References Cited

U.S. PATENT DOCUMENTS

| | | | |
|---|---|---|---|
| 2,922,211 A * | 1/1960 | Boyd | 411/551 |
| 2,931,471 A | 4/1960 | Howard, Jr. | |
| 2,946,612 A * | 7/1960 | Ahlgren | 292/17 |
| 3,123,880 A * | 3/1964 | Barry | 411/352 |
| 3,124,993 A * | 3/1964 | Schuluetter | 411/352 |
| 3,375,749 A * | 4/1968 | Coldren et al. | 411/15 |
| 3,406,431 A | 10/1968 | Armstrong et al. | |
| 3,472,542 A | 10/1969 | Hart | |
| 3,486,158 A | 12/1969 | Soltysik et al. | |
| 3,504,875 A * | 4/1970 | Johnson et al. | 411/549 |
| 3,842,709 A * | 10/1974 | Fuqua | 411/350 |
| 3,875,843 A * | 4/1975 | Maeda et al. | 411/548 |
| 3,893,211 A * | 7/1975 | Skinner | 411/349 |
| 4,067,090 A * | 1/1978 | Schenk | 411/554 |
| 4,128,923 A * | 12/1978 | Bisbing | 411/552 |
| 4,262,394 A | 4/1981 | Wright | |
| 4,300,865 A * | 11/1981 | Murray | 411/15 |
| 4,502,193 A | 3/1985 | Harmon et al. | 24/621 |
| 4,506,419 A | 3/1985 | Mitomi | 24/297 |
| 4,579,492 A * | 4/1986 | Kazino et al. | 411/80.1 |
| 4,580,322 A * | 4/1986 | Wright et al. | 24/662 |
| 4,595,325 A | 6/1986 | Moran et al. | |
| 4,610,588 A | 9/1986 | Van Buren, Jr. et al. | |
| 4,786,225 A * | 11/1988 | Poe et al. | 403/408.1 |
| 4,893,978 A | 1/1990 | Frano | |
| 4,897,005 A | 1/1990 | Peterson et al. | |
| 4,925,351 A | 5/1990 | Fisher | |
| 4,952,106 A * | 8/1990 | Kubogochi et al. | 411/48 |
| 5,011,355 A * | 4/1991 | Motoshige | 411/552 |
| 5,186,517 A * | 2/1993 | Gilmore et al. | 296/214 |
| 5,251,467 A | 10/1993 | Anderson | |
| 5,261,772 A * | 11/1993 | Henninger et al. | 411/46 |
| 5,306,091 A | 4/1994 | Zaydel et al. | |
| 5,507,610 A | 4/1996 | Benedetti et al. | |
| 5,669,108 A * | 9/1997 | Ferrari et al. | 16/383 |
| 5,725,324 A * | 3/1998 | Pavelski | 403/321 |
| 6,095,734 A * | 8/2000 | Postadan et al. | 411/182 |
| 6,176,660 B1 * | 1/2001 | Lewis et al. | 411/45 |
| 6,196,756 B1 * | 3/2001 | Leverger | 403/326 |
| 6,280,129 B1 * | 8/2001 | Lowry et al. | 411/55 |
| 6,283,689 B1 | 9/2001 | Roytberg et al. | |
| 6,371,708 B1 * | 4/2002 | Tresorier | 411/344 |
| 6,409,446 B1 * | 6/2002 | Schwarz | 411/552 |
| 6,443,679 B1 * | 9/2002 | Schwarz | 411/352 |
| 6,568,893 B2 * | 5/2003 | LeVey et al. | 411/349 |
| 6,575,682 B1 | 6/2003 | Dohm et al. | |
| 6,612,795 B2 | 9/2003 | Kirchen | |
| 6,827,536 B1 * | 12/2004 | Leon et al. | 411/61 |
| 6,908,274 B1 * | 6/2005 | Vassiliou | 411/437 |
| 6,955,515 B2 | 10/2005 | Barina et al. | |
| 7,073,230 B2 * | 7/2006 | Boville | 24/297 |
| 7,086,125 B2 | 8/2006 | Slobodecki et al. | |
| 7,188,392 B2 | 3/2007 | Giugliano et al. | |
| 7,207,758 B2 * | 4/2007 | Leon et al. | 411/45 |
| 7,226,260 B2 * | 6/2007 | Jackson et al. | 411/173 |
| 7,320,157 B2 | 1/2008 | Lubera et al. | |
| 7,374,200 B2 * | 5/2008 | Ikeda et al. | 411/45 |
| 7,399,151 B2 * | 7/2008 | Lubera et al. | 411/522 |
| 7,496,993 B2 * | 3/2009 | Kosidlo et al. | 24/295 |
| 7,568,870 B2 * | 8/2009 | Paquet | 411/177 |
| 8,016,530 B2 * | 9/2011 | Johnson et al. | 411/173 |
| 8,210,786 B2 * | 7/2012 | Okada et al. | 411/526 |
| 8,636,454 B2 * | 1/2014 | Okada et al. | 411/45 |
| 8,650,722 B2 * | 2/2014 | Hosoya et al. | 24/289 |
| 2001/0025404 A1 | 10/2001 | Wright | |
| 2004/0223826 A1 * | 11/2004 | Leon et al. | 411/44 |
| 2005/0095080 A1 * | 5/2005 | Kim | 411/349 |
| 2006/0198714 A1 * | 9/2006 | Lesecq | 411/44 |
| 2008/0193250 A1 * | 8/2008 | Boubtane | 411/48 |
| 2009/0028660 A1 * | 1/2009 | Csik et al. | 411/103 |
| 2009/0180842 A1 * | 7/2009 | Johnson et al. | 411/101 |
| 2010/0135721 A1 * | 6/2010 | Ramsauer | 403/408.1 |
| 2010/0284760 A1 * | 11/2010 | Rotolo et al. | 411/44 |
| 2011/0123296 A1 * | 5/2011 | Csik et al. | 411/511 |

FOREIGN PATENT DOCUMENTS

WO  WO 2010/104653 A1 *  9/2010
WO  WO 2011/011663 A1 *  1/2011

* cited by examiner

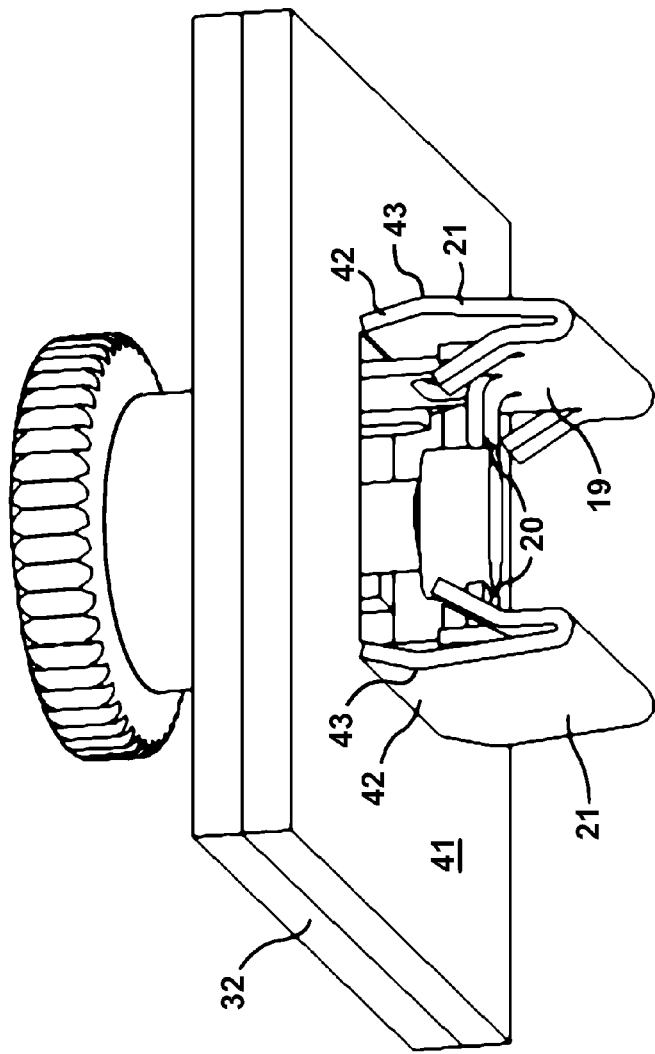

QUICK ACTING PANEL FASTENER

RELATED APPLICATION

This patent application is related to provisional patent application Ser. No. 61/228,314 entitled "Quick Acting Panel Fastener" filed on Jul. 24, 2009, priority from which is hereby claimed.

FIELD OF THE INVENTION

The present invention relates to a releasable panel fastener with a body member and a manually rotatable spindle therein. In use, the body member extends from an attached first planar panel into releasable engagement through an aperture in a second panel for the purpose of releasably interconnecting the two panels.

BACKGROUND OF THE INVENTION

There have been examples in the art of quick-acting panel fasteners for releasably joining two panels in face-to-face relation by inserting the fastener through aligned holes in the panels and turning one of the elements of the fastener. These fasteners are sometimes referred to as "quarter-turn" panel fasteners. A top panel is first more or less permanently affixed to a retainer part of the fastener. Then, an actuator can be turned either by finger pressure or with a tool whereby an underlying second panel becomes secured to the back of top panel. Examples in the art of such fasteners include U.S. Pat. No. 3,406,431 issued to Armstrong et al. and U.S. Pat. No. 6,955,515 issued to Barina et al. A commercially available part which provides the above-described panel joinder capability is the D-Snap™ captive snap joinder fastener sold by DIRAK GMBH and Co. In an attempt to create lower cost yet effectively performing panel fasteners, metal stamped parts have been employed as shown for example in U.S. Pat. No. 7,086,125 issued to Slobodecki et al. and U.S. Pat. No. 7,188,392 issued to Giuguliano. However, this technology is not known to have been successfully applied to quarter-turn panel fasteners.

While these attempts in the art to provide a quick-acting or quarter-turn panel fastener, they are very expensive parts to manufacture. There is no known quick-acting panel fastener having a retainer made from a unitary sheet metal stamping. Therefore, there is a need in the art for a quick-acting panel fastener which effectively and securely joins two panels face-to-face that is effective, economical to produce and easy to use.

SUMMARY OF THE INVENTION

In order to meet the needs in the art, the present panel fastener has been devised which is comprised of two separately formed interacting parts: a panel retainer and an actuator pin. The retainer is fashioned from sheet metal using progressive stamping technology. The retainer and pin work together to create a fastener that can semi-permanently snap into a first panel and then be clamped onto and then selectively removed from a second panel. The retainer snaps into a shaped hole in the first panel and the attachment to the second panel can be achieved or released by turning a knob that rotates the pin into detented self-locking positions. The head can be configured for hand actuation, tool-only actuation, or both. The present fastener is ultra-low-cost, utilizing a progressively stamped retainer and a cold-forged knob and pin.

More specifically, the Applicant has devised a panel fastener comprising a unitary stamped sheet metal retainer having a central rotating actuator pin. The retainer includes outwardly deflectable resilient barbs for providing a loose snap-in retention to a first panel through a square hole having deflector tabs for engaging the barbs upon insertion. Resilient legs on the retainer are laterally expandable for engagement with the backside of a square hole through a second panel for securing the first panel to it face-to-face. The pin is rotatably secured to the body portion of the retainer and it is manually rotatable between engaged and disengaged selected positions. The pin includes a cam on its end which co-acts with followers on the legs for selectively moving the legs to an expanded state where the pin is in the engaged position. In its expanded state, the legs of the retainer apply a resilient clamp load against the backside of the second panel. To enhance its operation, opposing sides of the expandable retainer include forked cam followers which capture opposing lobes of the cam when the pin is in the engaged position thereby holding the pin in a locked position.

The above-described fastener is preferably used to hold two panels together. This assembly comprises a first panel having a first hole therethrough and a second panel having a second hole therethrough with the first and second panels being positioned face-to-face with their respective holes in alignment. The first panel includes a pair of opposing tabs which extend inwardly toward the center of the first hole which engage the barbs upon insertion of the retainer into the first hole. The legs of the retainer are preferably folded upwardly from primary walls. The walls extending downward from the body and the legs, passing through the second hole, engage a backside of the second panel when the expander is turned to the engaged position. An upward facing edge at the end of each leg abuts the backside of the second panel. Each leg may include a bend providing longitudinal resilience to the leg whereby an upward biasing force is applied to the backside of the second panel when the legs are in the engaged position.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a bottom left front isometric view of the fastener inserted through both panels and in the engaged and locked position.

DESCRIPTION OF THE PREFERRED EMBODIMENT

Figure 1:
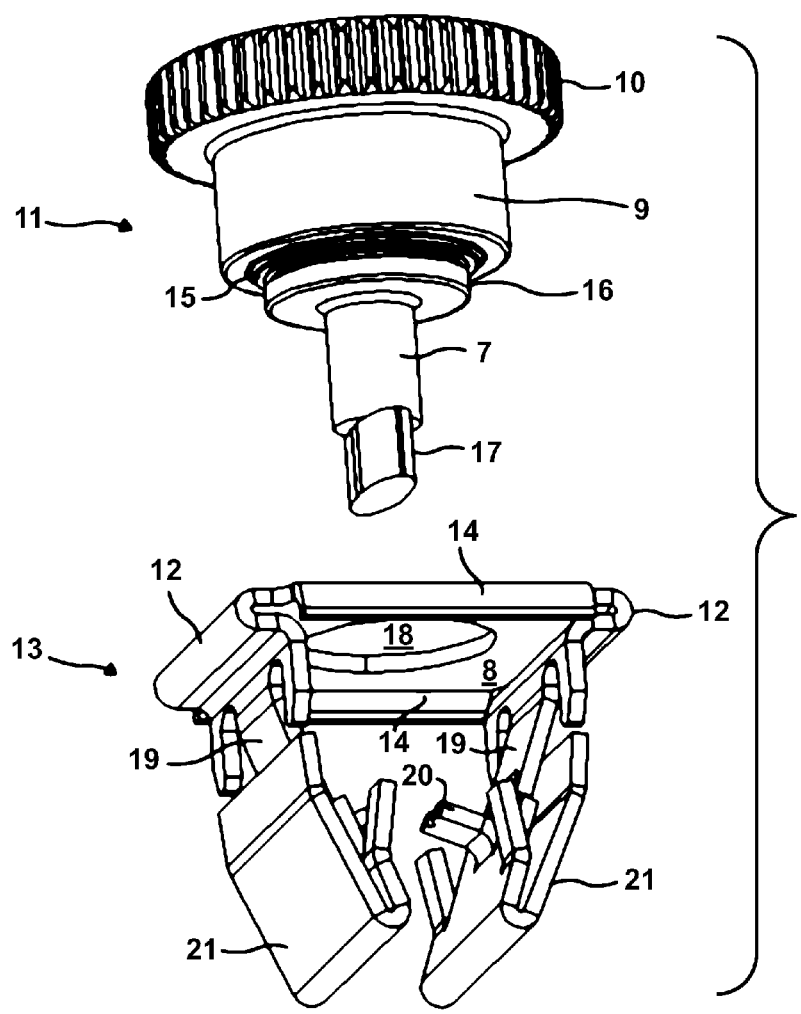
FIG. 1 is a bottom front left perspective assembly view.
Figure 2:
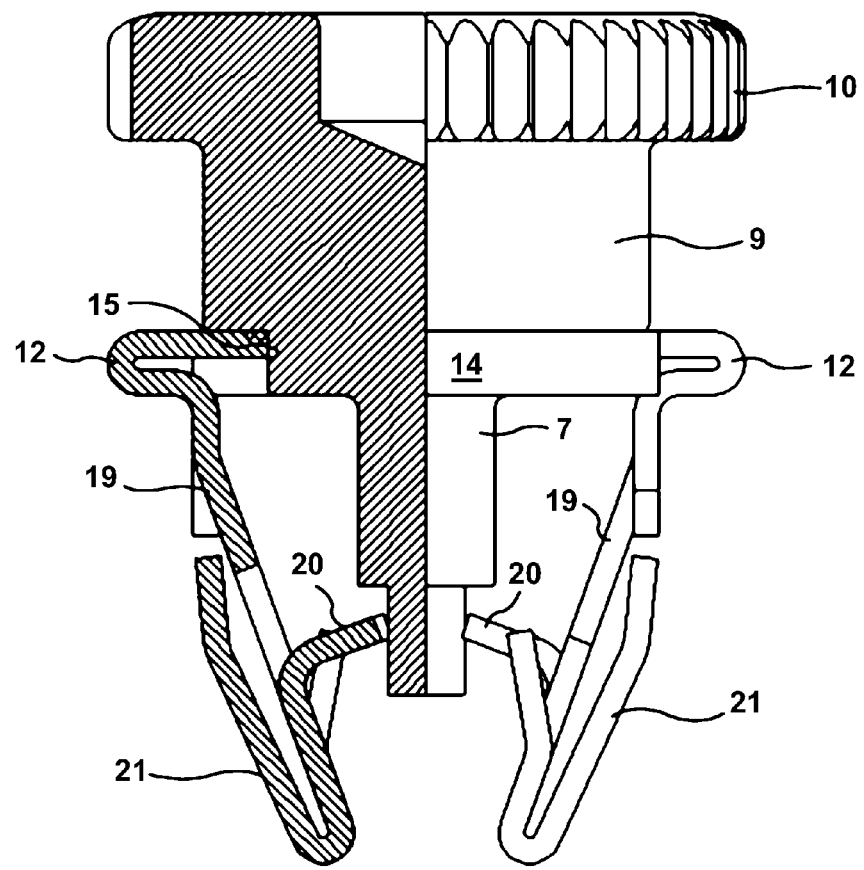
FIG. 2 is a front elevational partially-sectioned view of the invention as assembled.

Referring now to FIGS. 1 and 2, the present fastener is comprised of two components, an actuator pin 11 and a retainer 13. The end of the pin 11 carries an elliptical cam 17 with two lobes 180° apart providing a narrow cross-section and a wide cross-section that are 90° apart. A shank portion 7 of the pin extends between the cam and the head 9 of the pin. Between the pin's head and shank is a flange 16 having clinch features 15 along its circumference comprising a displacer and an undercut dimensioned relative to a receiving hole in the body of the retainer to permit rotation while maintaining axial captivation. The head 9 may contain any number of features used to turn the pin such as a knurled knob 10 for manual operation as shown in this embodiment and/or a drive for tool use. Other options include a t-handle pin, phillips-drive or a slot. The pin is made using cold forging technology.

Referring now to the retainer 13 of FIGS. 1 and 2, a body portion 8 of the retainer provides support for the underside of the head 9 of the pin 11 that is centrally located thereon by the receiving hole 18. During assembly, the flange 16 carrying the clinch features 15 is inserted and clinched into this hole. The retainer is made by progressively stamping a sheet metal blank whereby the blank is cut and folded to produce the various operative features described below.

The retainer body 8 is substantially square having one pair of opposing side edges 12 that are doubled over 180° while the remaining pair of opposing sides 14 are crimped downward 90° to provide a standoff clearance at these sides. This construction presents contact surfaces with the top side of the first of two panels (hereinafter the "first panel") that all lie in the same plane for stable support of the retainer as shown more clearly in FIG. 2.

The material of the doubled-over side portions 12 of the retainer continues into a pair of downward-extending primary walls 19, one on each side of the retainer. Extending inwardly from each of the primary walls are opposing cam followers 20. Varying the width of the primary walls varies the closing force of the retainer which supplies gripping engagement on opposite sides of the cam 17. The primary walls 19 extend the remaining length of the retainer and then are folded back outwardly and upward to form retaining legs 21 that, as described in more detail below, secure a second panel (hereinafter the "releasable panel").

Figure 3:
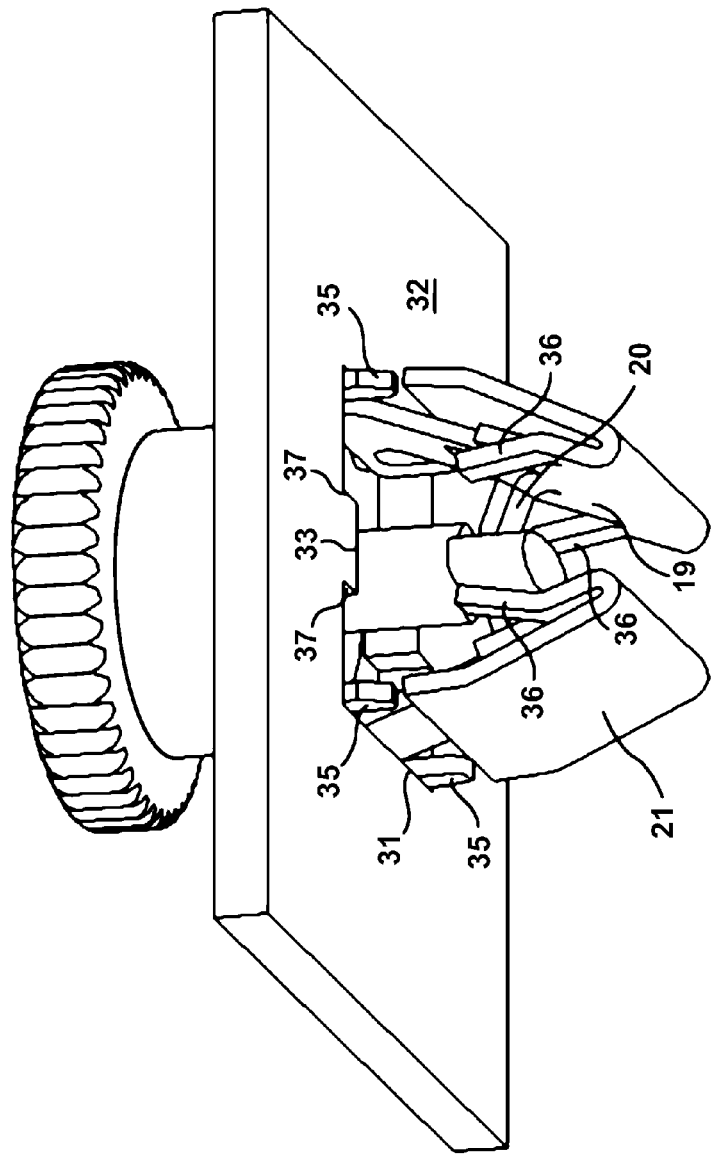
FIG. 3 is a bottom front left isometric view of the fastener loosely attached to the first panel.

Referring now to FIG. 3, a square hole 31 of the first panel 32 includes inward facing tabs 33. The hole in the second or releasable panel (not shown in this figure) has the same outside dimensions as the hole in the first panel except without the tabs. Insertion alignment of the holes of both panels to the sides of the fastener is achieved by guide fingers 35 which extend downward from the fastener body at each corner. The array of fingers match the corners of the holes in both panels and each finger is chamfered to aid alignment as they are inserted through each panel.

In use, the assembled fastener is initially inserted into the first panel 32 which accepts the retainer by snap action of barbs 36 that extend inwardly from the primary walls 19 at an upward angle. As the fastener is snapped into the first panel, the barbs flex outwardly, pushed by the lateral side edges 37 of tabs 33 in the first panel. The barbs 36 cannot pass around the tabs in the opposite direction of removal because their free position presents a gap between them that is less than the width of the tabs. Hence, the fastener may only be removed non-destructively by a tool used to flex the barbs outward to clear the tabs on the first panel. With the fastener in its relaxed state as shown and loosely affixed to the first panel in this near permanent manner, the second releasable panel can now be joined. In the relaxed state, the narrow sides of the cam occupy the detents in the followers 20 and the retainer legs 21 remain tucked inward to provide a clearance with the hole in the releasable panel.

Once engaged with the first panel as shown in FIG. 3, the releasable panel is placed against the back side of the first panel for securement. As shown in FIG. 4, with the panels held face-to-face, the pin is then turned 90° in either direction to move the retainer legs 21 outward to a position that locks the releasable panel 41 mated flush against the first panel 32. This outward movement of the legs 21 is caused by the increase in lateral width of the cam 17 which pushes the legs 21 of the fastener outwardly and against the underside of the releasable panel 41. The inwardly biased spring force of each primary wall 19 clamps forked ends of the opposing followers 20 into continual engagement with the cam as it is turned. The fork shape of the follower ends form detents that receive the cam lobes. These detents provide a tactile and audible positioning response that indicates the fully engaged and stable position of the pin. Adding to their effectiveness, angled end portions 42 beginning at bends 43 of the retainer legs 21 flex against the backside of the releasable panel 41 providing an upwardly biased spring force that creates a clamp load resiliently holding the panels together. Subsequent turning of the pin releases or disengages the assembly again allowing the releasable panel to be separated and removed from the assembly.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A panel fastener assembly comprising:
   a first panel having a first hole therethrough;
   a second panel having a second hole therethrough, said first and second panels being positioned face-to-face against each other with said holes in alignment;
   a fastener assembly comprising a rotatable pin joined to a unitary retainer, the unitary retainer of said fastener assembly including a body portion at a top end and resilient outwardly deflectable barbs for providing loose snap-in retention to the first panel by extending through the first hole and by engagement of said barbs with a backside of said first panel;
   said retainer further including primary walls extending downwardly from the body portion, said primary walls having deflectable legs folded upwardly at the bottom ends of the primary walls, upward facing terminal edges of said legs resiliently engagable with a backside of the second panel; and
   wherein said rotatable pin is rigidly affixed to said retainer body portion axially and extends downwardly from said body portion between said legs, said pin being rotatably operative to selectively move said legs laterally between an engaged position and a releasing disengaged position of said fastener assembly unitary retainer with said second panel.

2. The assembly of claim 1 wherein said pin comprises a cam having lobes which are engageable with inward facing portions of said primary walls, said pin being rotatable to select the engaged and disengaged positions of said legs.

3. The assembly of claim 2 wherein said pin is further described as having a manual knob at one end for turning said pin, a shank downwardly extending from said knob and wherein said cam lobes are laterally extending and affixed to an opposite end of the shank.

4. The assembly of claim 3 wherein each primary wall includes an inward facing follower which captures toe portions of the cam lobes when said pin is turned to said engaged position of said legs thereby holding said pin against unwanted rotation in either direction.

5. The assembly of claim 1 wherein said retainer has guide fingers that extend downwardly from the body portion and which are located to closely match aligned corners of the first and second holes.

6. The assembly of claim 1 wherein said legs each include a bend providing longitudinal resilience whereby an upward biasing force is applied to the backside of said second panel when said legs are in the engaged position.

7. The assembly of claim 1 wherein the first panel includes a pair of opposing tabs which extend inwardly toward the center of the first hole, said tabs engaging said barbs first upon insertion of said retainer into said first hole and thereafter engaging a backside of the tabs to loosely affix said retainer to said first panel.

8. The assembly of claim 6 wherein said retainer is constructed of a unitary folded stamped metal sheet.

9. The assembly of claim 7 wherein said pin has a head portion immediately below a knob and clinch attachment features immediately below said head, said clinch features providing rotatable attachment by press-fit of said pin into the body of said retainer.

10. The assembly of claim 9 wherein said pin further includes a cylindrical flange located immediately below said clinch features, the diameter of said flange closely corresponding to an inside diameter of a receiving hole in said body portion of said retainer through which said pin extends.

11. The assembly of claim 10 wherein said engaged and disengaged positions of said pin are separated by 90° of rotation of said pin.

12. The assembly of claim 4 wherein each of said followers includes a forked end providing a detent which captures one of the cam lobes.

13. A panel fastener assembly comprising:

a first panel having a first hole therethrough;

a second panel having a second hole therethrough, said first and second panels being positioned face-to-face with said holes in alignment;

a unitary retainer of said a panel fastener assembly, said retainer including a body and resilient outwardly deflectable barbs for providing snap-in retention to the first panel by extending through the first hole and by engagement of said barbs with a backside of said first panel; and said retainer further including a pair of laterally opposite resilient outwardly deflectable legs folded upwardly from primary walls, said walls extending downward from said body, said legs resiliently engaging a backside of the second panel;

an expander pin rotatably affixed to said body and extending downwardly from said body between said legs, said expander pin being rotatably operative to push said legs outwardly to a selected position of engagement with said second panel; and wherein said pin further includes a head portion immediately below a knob and clinch attachment features immediately below said head, said clinch features providing rotatable attachment by press-fit of said pin into the body of said retainer.

* * * * *